US006585081B1

(12) United States Patent
Jerome

(10) Patent No.: US 6,585,081 B1
(45) Date of Patent: Jul. 1, 2003

(54) FIRE ESCAPE DEVICE

(76) Inventor: Lynette J. Jerome, 208-04 100 Avenue, Queens Village, NY (US) 11429

( * ) Notice: Subject to any disclaimer, the term of this patent is extended or adjusted under 35 U.S.C. 154(b) by 0 days.

(21) Appl. No.: 10/056,446

(22) Filed: Jan. 25, 2002

(51) Int. Cl.[7] .......................... A62B 1/20; B65G 15/00

(52) U.S. Cl. .......................................... 182/48; 182/43

(58) Field of Search .............................. 182/48, 43, 70; 193/2 R, 25 A; 244/137.1, 137.2, 905

(56) References Cited

U.S. PATENT DOCUMENTS 3,910,377 A 10/1975 Zamorski
4,005,762 A 2/1977 Zephinie
4,162,717 A 7/1979 Orii et al.
4,398,621 A 8/1983 Baker
4,582,166 A 4/1986 Baker
4,990,114 A * 2/1991 LeBlanc, Jr. .............. 182/48 X
5,060,753 A 10/1991 Hopkins
D329,315 S 9/1992 Loefke et al.
5,427,574 A * 6/1995 Donnelly-weide ........... 182/49

* cited by examiner

*Primary Examiner*—Daniel P. Stodola
*Assistant Examiner*—Hugh B. Thompson

(57) ABSTRACT

A fire escape device for escaping a building through a widow during a fire includes a platform having a first edge, a second edge, a third edge and a fourth edge wherein the first and second edges are opposite edges. A coupling member is attached to the first edge for coupling the platform to a window frame. An elongated member has a first end and a second end. The elongated member has a bottom wall and a pair of side walls such that the elongated member generally has U-shape cross-section taken transversely to a longitudinal axis of the elongated member. The first end of the elongated member is attached to the second edge of the platform. The platform forms an angle with respect to the longitudinal axis. The side walls extend upwardly and the elongated member extends at a downward angle when the platform is at a generally horizontal orientation.

5 Claims, 2 Drawing Sheets

FIG. 3
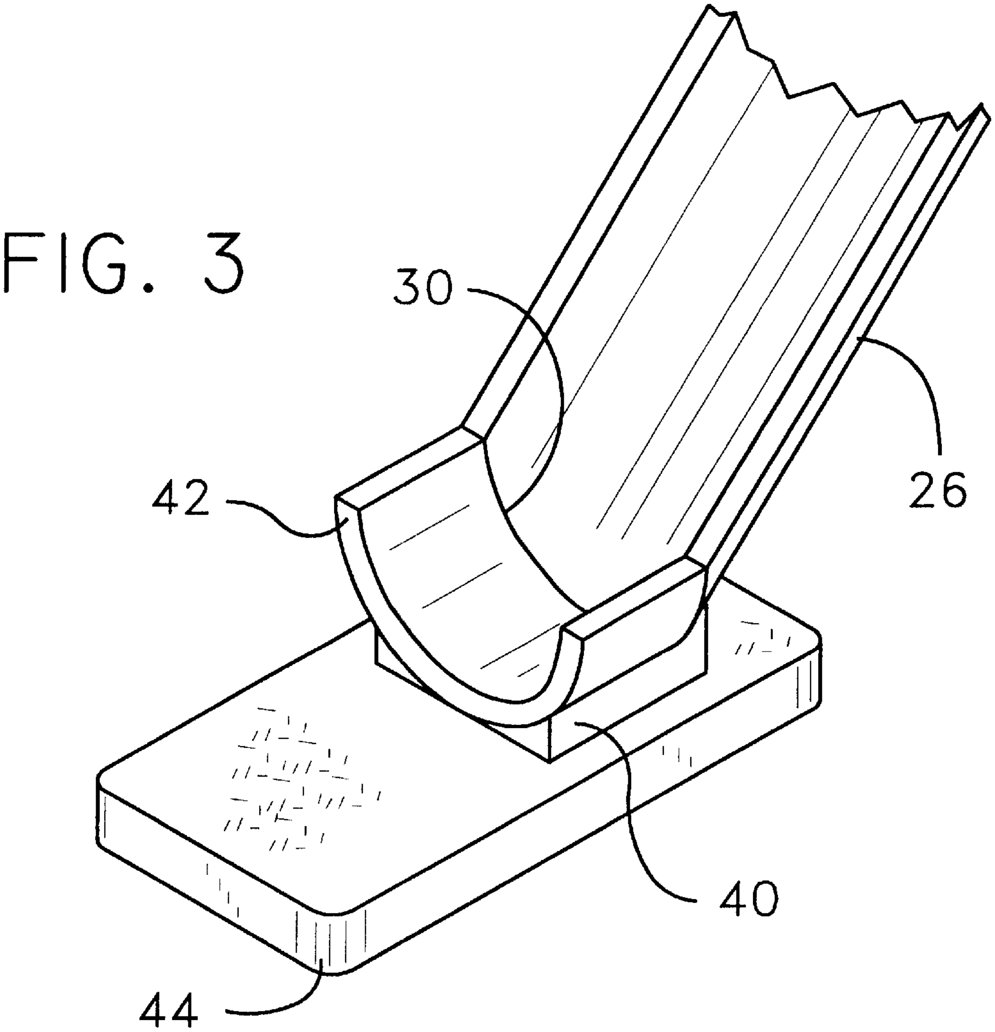
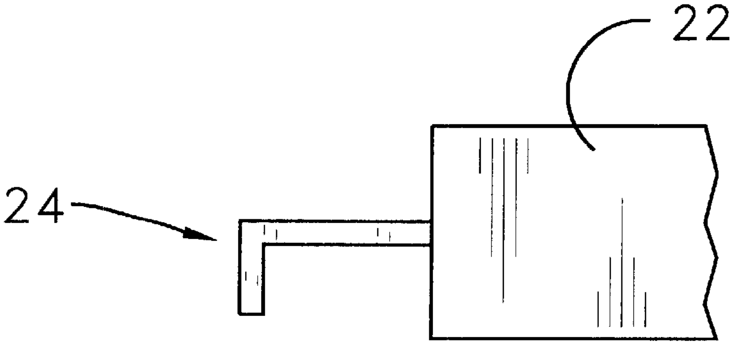
FIG. 4

FIRE ESCAPE DEVICE

BACKGROUND OF THE INVENTION

1. Field of the Invention

The present invention relates to fire escapes and more particularly pertains to a new fire escape device for escaping a building through a widow during a fire.

2. Description of the Prior Art

The use of fire escapes is known in the prior art. More specifically, fire escapes heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,398,621; U.S. Pat. No. 5,060,753; U.S. Pat. No. 3,910,377; U.S. Pat. No. 4,005,762; U.S. Pat. No. 4,162,717; U.S. Pat. No. 4,582,166; and U.S. Des. Pat. No. 329,315.

While these devices fulfill their respective, particular objectives and requirements, the aforementioned patents do not disclose a new fire escape device. The inventive device includes a first platform having a first edge, a second edge, a third edge and a fourth edge wherein the first and second edges are opposite edges. A coupling member is attached to the first edge and is adapted for coupling the first platform to a window frame. An elongated member has a first end and a second end. The elongated member has a bottom wall and a pair of side walls such that the elongated member generally has U-shape cross-section taken transversely to a longitudinal axis of the elongated member. The elongated member comprises a substantially rigid material. The first end of the elongated member is attached to the second edge of the platform. The platform forms an angle with the longitudinal axis generally between 120 degrees and 150 degrees. The side walls extend upwardly and the elongated member extends at a downward angle when the platform is at a generally horizontal orientation.

In these respects, the fire escape device according to the present invention substantially departs from the conventional concepts and designs of the prior art, and in so doing provides an apparatus primarily developed for the purpose of escaping a building through a widow during a fire.

SUMMARY OF THE INVENTION

In view of the foregoing disadvantages inherent in the known types of fire escapes now present in the prior art, the present invention provides a new fire escape device construction wherein the same can be utilized for escaping a building through a widow during a fire.

The general purpose of the present invention, which will be described subsequently in greater detail, is to provide a new fire escape device apparatus and method which has many of the advantages of the fire escapes mentioned heretofore and many novel features that result in a new fire escape device which is not anticipated, rendered obvious, suggested, or even implied by any of the prior art fire escapes, either alone or in any combination thereof.

To attain this, the present invention generally comprises a first platform having a first edge, a second edge, a third edge and a fourth edge wherein the first and second edges are opposite edges. A coupling member is attached to the first edge and is adapted for coupling the first platform to a window frame. An elongated member has a first end and a second end. The elongated member has a bottom wall and a pair of side walls such that the elongated member generally has U-shape cross-section taken transversely to a longitudinal axis of the elongated member. The elongated member comprises a substantially rigid material. The first end of the elongated member is attached to the second edge of the platform. The platform forms an angle with the longitudinal axis generally between 120 degrees and 150 degrees. The side walls extend upwardly and the elongated member extends at a downward angle when the platform is at a generally horizontal orientation.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new fire escape device apparatus and method which has many of the advantages of the fire escapes mentioned heretofore and many novel features that result in a new fire escape device which is not anticipated, rendered obvious, suggested, or even implied by any of the prior art fire escapes, either alone or in any combination thereof.

It is another object of the present invention to provide a new fire escape device which may be easily and efficiently manufactured and marketed.

It is a further object of the present invention to provide a new fire escape device which is of a durable and reliable construction.

An even further object of the present invention is to provide a new fire escape device which is susceptible of a low cost of manufacture with regard to both materials and labor, and which accordingly is then susceptible of low prices of sale to the consuming public, thereby making such fire escape device economically available to the buying public.

Still yet another object of the present invention is to provide a new fire escape device which provides in the apparatuses and methods of the prior art some of the advantages thereof, while simultaneously overcoming some of the disadvantages normally associated therewith.

Still another object of the present invention is to provide a new fire escape device for escaping a building through a widow during a fire.

Yet another object of the present invention is to provide a new fire escape device which includes a first platform having a first edge, a second edge, a third edge and a fourth edge wherein the first and second edges are opposite edges. A coupling member is attached to the first edge and is adapted for coupling the first platform to a window frame. An elongated member has a first end and a second end. The elongated member has a bottom wall and a pair of side walls such that the elongated member generally has U-shape cross-section taken transversely to a longitudinal axis of the elongated member. The elongated member comprises a substantially rigid material. The first end of the elongated member is attached to the second edge of the platform. The platform forms an angle with the longitudinal axis generally between 120 degrees and 150 degrees. The side walls extend upwardly and the elongated member extends at a downward angle when the platform is at a generally horizontal orientation.

Still yet another object of the present invention is to provide a new fire escape device that may be retrofitted to existing buildings and may be moved from window to window as needed.

Even still another object of the present invention is to provide a new fire escape device that allows easy escape for persons who have difficulty walking or are otherwise generally immobile.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic perspective view of the present invention.

FIG. 4 is a schematic side view of the coupling member of the present invention.

DESCRIPTION OF THE PREFERRED EMBODIMENT

Figure 1:
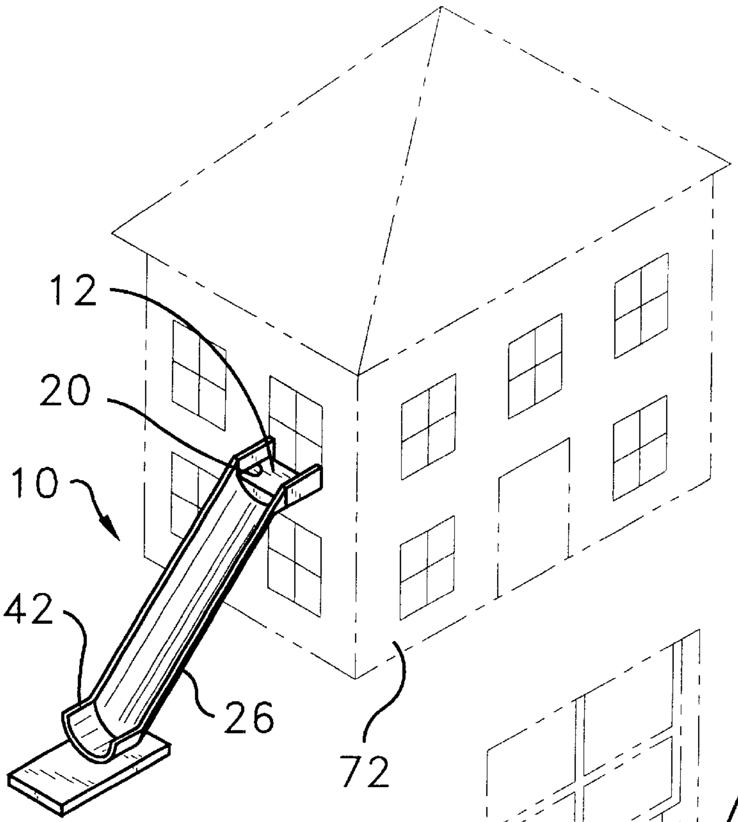
FIG. 1 is a schematic perspective view of a new fire escape device according to the present invention.
Figure 2:
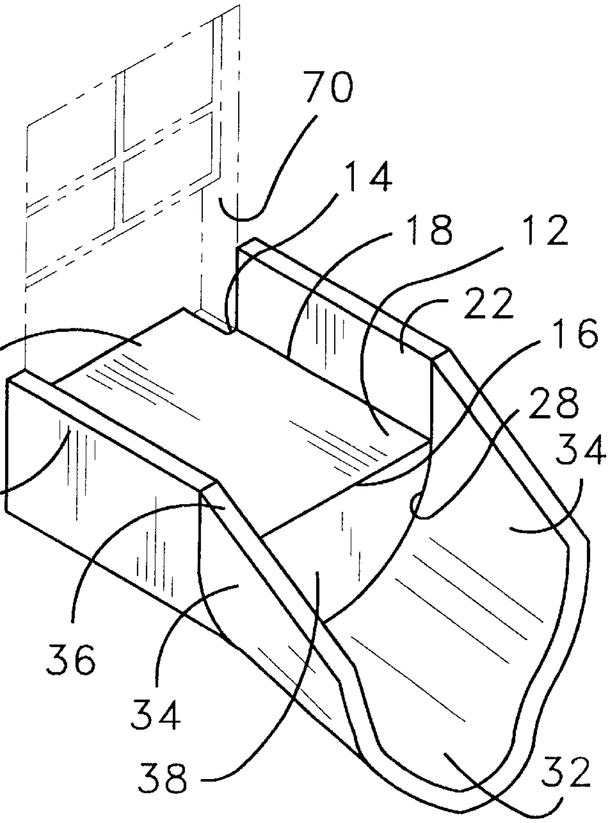
FIG. 2 is a schematic perspective view of the present invention.

With reference now to the drawings, and in particular to FIGS. 1 through 4 thereof, a new fire escape device embodying the principles and concepts of the present invention and generally designated by the reference numeral 10 will be described.

As best illustrated in FIGS. 1 through 4, the fire escape device 10 generally comprises a fire escape device for positioning adjacent to a window frame 70. Alternatively the device 10 may be permanently attached to a building 72 just below a window of a building 72. The device 10 includes a first platform 12 having a first edge 14, a second edge 16, a third edge 18 and a fourth edge 20 wherein the first 14 and second 16 edges are opposite edges. Each of a pair of vertical walls 22 is attached to and extends along a length of one of the third 18 and fourth 20 edges.

A coupling member 24 is attached to the first edge 14 and is adapted for coupling the first platform 12 to the window frame 70. The coupling member 24 includes a hook for positioning over the window frame 70.

An elongated member 26 has a first end 28, and a second end 30. The elongated member 26 has a bottom wall 32 and a pair of side walls 34 such that the elongated member 26 generally has U-shape cross-section taken transversely to a longitudinal axis of the elongated member 26. The elongated member 26 comprises a substantially rigid material which is preferably a plastic material, though a metal may also be used. The first end 28 of the elongated member 26 is attached to the second edge 16 of the platform 12. The platform 12 forms an angle with the longitudinal axis generally between 120 degrees and 150 degrees. The side walls 34 extend upwardly and the elongated member 26 extends at a downward angle when the platform 12 is at a generally horizontal orientation as shown in FIG. 1. The platform 12 is positioned generally between an upper edge 36 of the side walls 34 and the bottom wall 32. Each of the pair of vertical walls 22 is attached to one of the side walls 34. A guard wall 38 is attached the second edge 14 of the platform 12. The guard wall 38 extends downward and is attached to the bottom wall 32 of the elongated member 26.

A second platform 40 is attached to the second end 30 of the elongated member 26. The second platform 40 lies in a plane orientated generally parallel to a plane of the first platform 12. A semi-cylindrical member 42, or hemi-cylindrical member, is attached to an upper surface of the second platform 40. The semi-cylindrical member 42 has an edge attached to and extending along the length of the second end 30 of the elongated member 26.

A cushion member 44 for positioning under the second platform 40 has a size greater than the second platform 40. The cushioning member. 44 is preferably comprised of conventional cushioning material such as foamed rubber.

In use, the device 10 is positioned on a window frame 70 as needed. The coupling member 24 secures it in place. During a fire, persons within a dwelling may escape the dwelling by going through the window frame 70 and sliding down the device 10. The cushion member 44 helps to cushion the landing of the user of the device.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fire escape device for positioning adjacent to a window frame, said device comprising:

a first platform having a first edge, a second edge, a third edge and a fourth edge wherein said first and second edges are opposite edges;

a coupling member being attached to said first edge and adapted for coupling said first platform to said window frame;

an elongated member having a first end, and a second end, said elongated member having a bottom wall and a pair of side walls such that said elongated member generally has U-shape cross-section taken transversely to a longitudinal axis of said elongated member, said elongated member comprising a substantially rigid material, said first end of said elongated member being attached to said second edge of said platform, said platform forming an angle with the longitudinal axis generally between 120 degrees and 150 degrees, wherein said side walls extend upwardly and said elongated member extends at a downward angle when said platform is at a generally horizontal orientation;

a second platform being attached to said second end of said elongated member, said second platform lying in a plane orientated generally parallel to a plane of said first platform; and a semi-cylindrical member being attached to an upper surface of said second platform, said semi-cylindrical member having an edge attached to and extending along the length of said second end of said elongated member.

2. The fire escape device as in claim 1, further including each of a pair of vertical walls being attached to and extending along a length of one of said third and fourth edges, each of said vertical walls being attached to one of said side walls of said elongate member.

3. The fire escape device as in claim 1, wherein said coupling member includes a hook for positioning over the window frame.

4. The fire escape device as in claim 1, further including a cushion member for positioning under said second platform, said cushion member having a size greater than said second platform.

5. A fire escape device for positioning adjacent to a window frame, said device comprising:

a first platform having a first edge, a second edge, a third edge and a fourth edge wherein said first and second edges are opposite edges, each of a pair of vertical walls being attached to and extending along a length of one of said third and fourth edges;

a coupling member being attached to said first edge and adapted for coupling said first platform to said window frame, said coupling member including a hook for positioning over the window frame;

an elongated member having a first end, and a second end, said elongated member having a bottom wall and a pair of side walls such that said elongated member generally has U-shape cross-section taken transversely to a longitudinal axis of said elongated member, said elongated member comprising a substantially rigid material, said first end of said elongated member being attached to said second edge of said platform, said platform forming an angle with the longitudinal axis generally between 120 degrees and 150 degrees, wherein said side walls extend upwardly and said elongated member extends at a downward angle when said platform is at a generally horizontal orientation, said platform being positioned generally between an upper edge of said side walls and said bottom wall, each of said vertical walls being attached to one of said side walls, a guard wall being attached said second edge of said platform, said guard wall extending downward and being attached to said bottom wall of said elongated member;

a second platform being attached to said second end of said elongated member, said second platform lying in a plane orientated generally parallel to a plane of said first platform, a semi-cylindrical member being attached to an upper surface of said second platform, said semi-cylindrical member having an edge attached to and extending along the length of said second end of said elongated member; and a cushion member for positioning under said second platform, said cushion member having a size greater than said second platform.

* * * * *